(12) United States Patent
Qiu et al.

(10) Patent No.: US 7,509,643 B2
(45) Date of Patent: Mar. 24, 2009

(54) METHOD AND APPARATUS FOR SUPPORTING ASYMMETRIC MULTI-THREADING IN A COMPUTER SYSTEM

(75) Inventors: Xiaogang Qiu, Santa Clara, CA (US); Si-En Chang, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 773 days.

(21) Appl. No.: 10/396,891

(22) Filed: Mar. 24, 2003

(65) Prior Publication Data

US 2004/0194094 A1 Sep. 30, 2004

(51) Int. Cl.
*G06F 9/46* (2006.01)
(52) U.S. Cl. .................... 718/103; 718/104
(58) Field of Classification Search ........... 718/100, 718/103–104; 711/173
See application file for complete search history.

(56) References Cited

U.S. PATENT DOCUMENTS 5,787,490 A * 7/1998 Ozawa ................ 711/173

2003/0208521 A1* 11/2003 Brenner et al. ........... 709/103

OTHER PUBLICATIONS

Henessy and Patterson, Computer Architecture: A Quantitative Approach, 2002, Morgan Kaufmann, 3rd Edition, p. 216-217 and p. 608-615.*

* cited by examiner

*Primary Examiner*—Meng-Ai An
*Assistant Examiner*—Eric C Wai
(74) *Attorney, Agent, or Firm*—Park, Vaughan & Fleming LLP; Edward J. Grundler

(57) ABSTRACT

One embodiment of the present invention facilitates favoring the performance of a single-threaded application in a computer system that supports simultaneous multi-threading (SMT), wherein multiple threads of execution simultaneously execute in an interleaved manner on functional units within a processor. During operation, the system maintains a priority for each simultaneously executing thread. The system uses these priorities in allocating a shared computational resource between the simultaneously executing threads, so that a thread with a higher priority is given preferential access to the shared computational resource. This asymmetric treatment of the threads enables+ the system to favor the performance of a single-threaded application while performing simultaneous multi-threading.

12 Claims, 4 Drawing Sheets

METHOD AND APPARATUS FOR SUPPORTING ASYMMETRIC MULTI-THREADING IN A COMPUTER SYSTEM

BACKGROUND

1. Field of the Invention

The present invention relates to techniques for improving computer system performance. More specifically, the present invention relates to a method and an apparatus for implementing simultaneous multi-threading (SMT) in an asynchronous manner to improve single-threaded performance within a computer system.

2. Related Art

As microprocessor clock speeds continue to increase at an exponential rate, it is becoming progressively harder to design processor pipelines to keep pace with these higher clock speeds, because less time is available at each pipeline stage to perform required computational operations. In order to deal with this problem, some designers have begun to investigate simultaneous multithreading (SMT) techniques that operating by interleaving the execution of unrelated processor threads (for example, in round-robin fashion) within a single processor pipeline. In this way, if N unrelated threads are interleaved, instructions for a given thread only appear once for every N consecutive pipeline stages. Hence, the N threads each run at $1/N^{th}$ of the native clock rate of the processor. For example, four threads, each running at three GHz, can collectively run on a 12 GHz processor.

SMT relaxes latency requirements, which makes it significantly easier to design a high-speed processor pipeline. For example, if four unrelated threads are interleaved, a data cache access (or an addition operation) can take up to four pipeline stages without adversely affecting the performance of a given thread.

Interleaving the execution of multiple threads within a single pipeline has other advantages. It saves power and area in comparison to executing the threads in separate pipelines. It also provides a large aggregate throughput for the single pipeline.

However, SMT does not improve performance for single-threaded applications. Single-threaded performance is important for a general-purpose processor because some applications inherently rely on single-threaded execution. Additionally, while legacy applications can benefit from single-threaded performance improvements, they cannot readily benefit from thread-level parallelism (TLP) improvements.

Hence, what is needed is a method and an apparatus for improving the performance of single-threaded applications in a computer system that supports simultaneous multi-threading.

SUMMARY

One embodiment of the present invention facilitates favoring the performance of a single-threaded application in a computer system that supports simultaneous multi-threading (SMT), wherein multiple threads of execution simultaneously execute in an interleaved manner on functional units within a processor. During operation, the system maintains a priority for each simultaneously executing thread. The system uses these priorities in allocating a shared computational resource between the simultaneously executing threads, so that a thread with a higher priority is given preferential access to the shared computational resource. This asymmetric treatment of the threads enables the system to favor the performance of a single-threaded application while performing simultaneous multi-threading.

In a variation of this embodiment, the shared resource includes an issue window within the processor. In this variation, instructions for threads with higher priority are given preferential treatment while selecting instructions to be executed from the issue window.

In a variation of this embodiment, the shared resource includes a store queue within the processor. In this variation, threads with higher priority are given preferential treatment in obtaining store queue slots.

In a variation of this embodiment, the shared resource includes a shared cache associated with the processor. In this variation, threads with higher priority are given preferential access to the shared cache.

In a variation of this embodiment, the shared resource includes an instruction fetch unit. In this variation, threads of execution with a higher priority are given preferential treatment during the instruction fetch process.

In a variation of this embodiment, a main thread of execution is assigned a highest priority.

In a further variation, multiple threads can be assigned the highest priority.

In a variation on this embodiment, preferential access to the shared resource can be disabled, so that the processor behaves like a conventional SMT processor.

Table 1 defines the priority inputs to the selector logic unit from the issue window in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Processor

Figure 1:
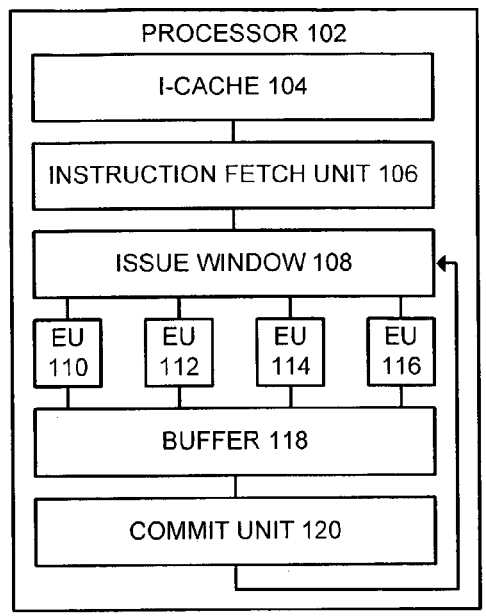
FIG. 1 illustrates a processor in accordance with an embodiment of the present invention.

FIG. 1 illustrates a processor in accordance with an embodiment of the present invention. Processor 102 includes instruction cache (I-cache) 104, instruction fetch unit 106, issue window 108, execution units 110, 112, 114, and 116, buffer 118, and commit unit 120.

I-cache 104 contains high-speed memory for storing instructions that are likely to be executed. During system operation, instruction fetch unit 106 retrieves instructions from I-cache 104 and forwards these instructions to issue window 108. The operation of I-cache 104, instruction fetch unit 106, and issue window 108 is discussed in more detail below in conjunction with FIG. 2.

Issue window 108 forwards instructions to execution units 110, 112, 114, and 116 based on thread priority as described below. The results from execution units 110, 112, 114, and 116 are stored in buffer 118 until they can be committed to the architectural state of the processor. Commit unit 120 provides feedback to issue window 108 to inform issue window 108 that the results of an instruction have been committed, and that the corresponding instruction can be retired from issue window 108.

Instruction Fetch Unit

Figure 2:
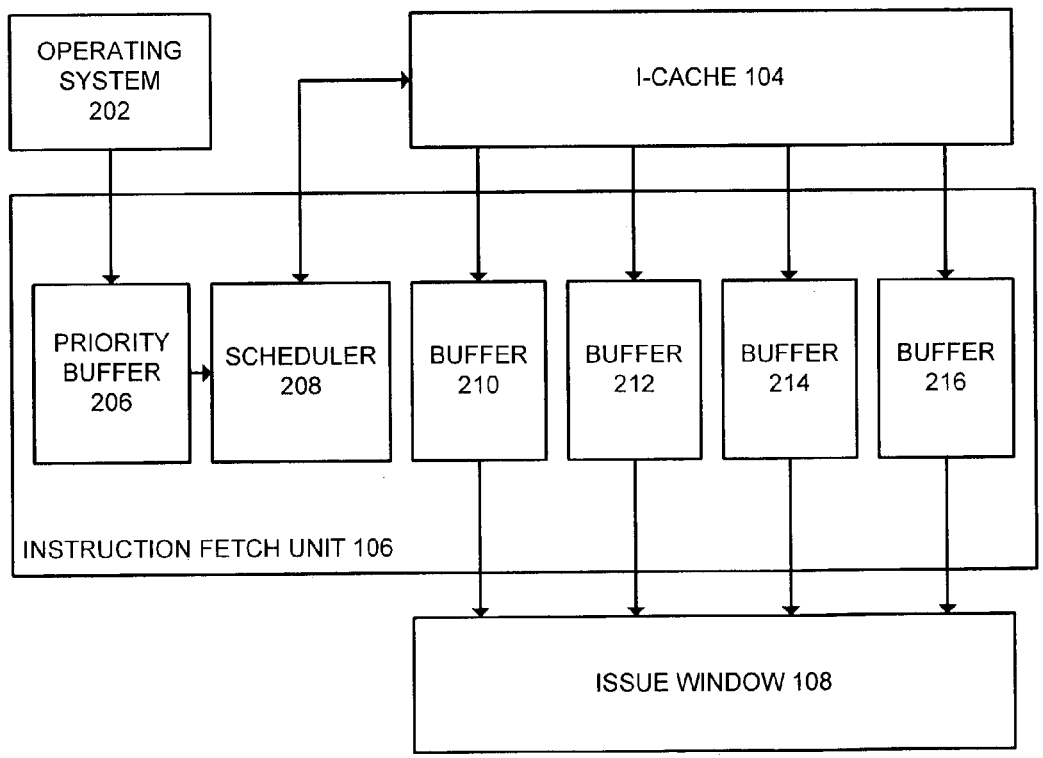
FIG. 2 illustrates an instruction fetch unit in accordance with an embodiment of the present invention.

FIG. 2 illustrates the structure of instruction fetch unit 106 in accordance with an embodiment of the present invention. Instruction fetch unit 106 includes priority buffer 206, scheduler 208, and buffers 210, 212, 214, and 216. During operation, computer operating system 202 communicates the priority for currently executing threads to priority buffer 206.

Scheduler 208 obtains the priorities from priority buffer 206 and schedules instruction retrieved from I-cache 104 based on these priorities. The instructions fetched from I-cache 104 are then sent to one of the buffers 210, 212, 214, and 216. One of these buffers, say buffer 210, is dedicated to instructions for the highest priority thread. Buffers 212, 214, and 216 similarly receive instructions for lower priority threads. Note that there can be more of fewer buffers than shown in FIG. 2. In another embodiment of the present invention, instruction fetch unit 106 includes two buffers—one for instructions of the highest priority thread and one for the remaining threads. Note also that more than one thread can be marked with the highest priority. In this case, the instructions from all threads marked with the highest priority can share the same buffer.

Buffers 210, 212, 214, and 216 provide instructions to issue window 108. The highest priority buffer, buffer 210, is given precedence while placing instructions in issue window 108.

Selector Logic Tree

Figure 3:
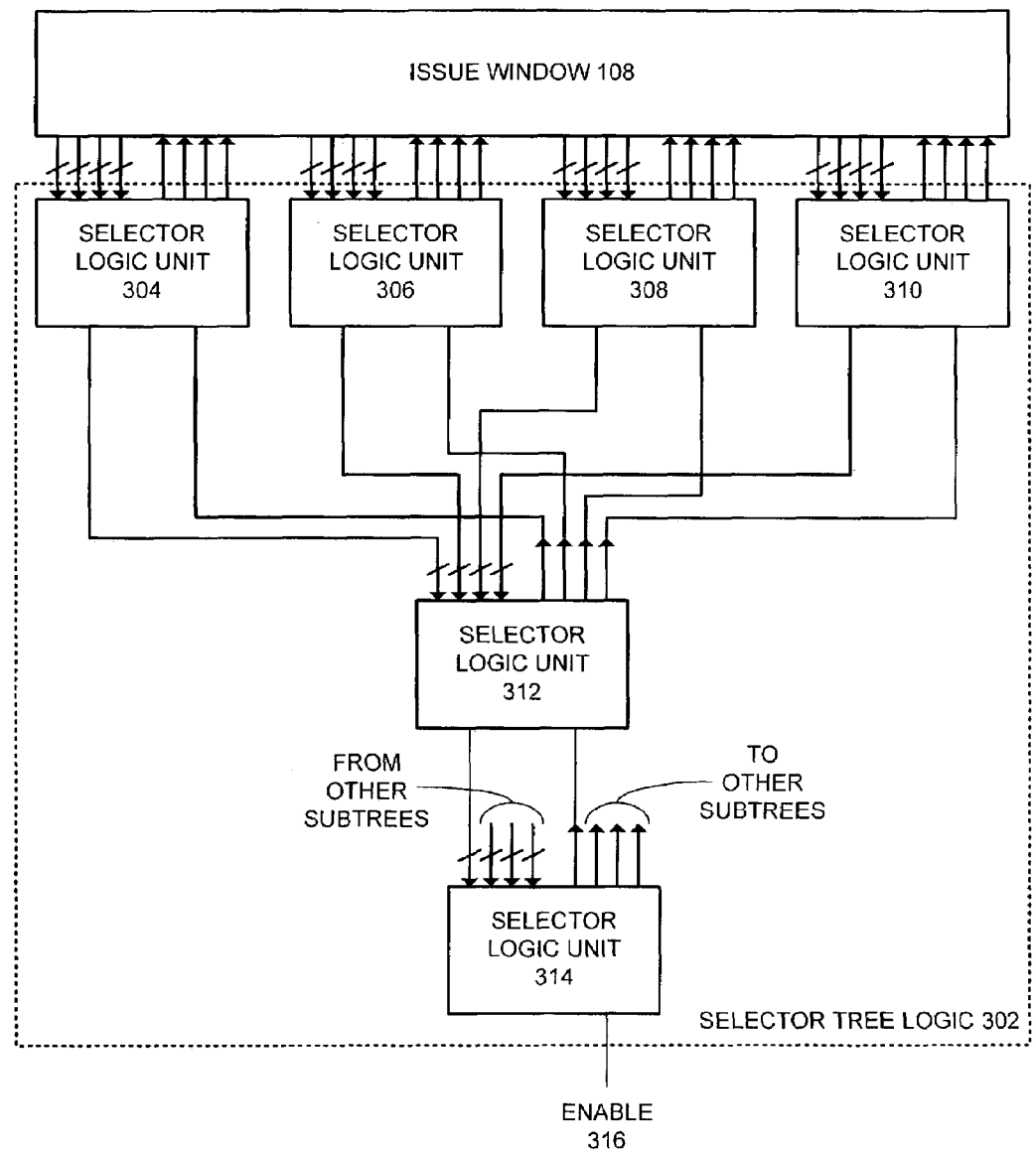
FIG. 3 illustrates a selector logic tree for an issue window in accordance with an embodiment of the present invention.

FIG. 3 illustrates a selector logic tree in for selecting instructions to be issued from issue window 108 in accordance with an embodiment of the present invention. Selector logic tree 302 includes selector logic units 304, 306, 308, 310, 312, and 314. These selector logic units 304, 306, 308, 310, 312, and 314 accept priority inputs from ready instructions within issue window 108 and then select which instruction will be issued when enable 316 is active. The operation of selector logic units 304, 306, 308, 310, 312, and 314 is discussed in more detail below in conjunction with FIG. 4. Note that selector logic tree 302 includes sufficient selector logic units to provide a priority input and an enable output for each instruction within issue window 108.

During operation of selector logic tree 302, selector logic tree 302 receives priority information for each instruction within issue window 108. This priority information is used to determine which instruction will receive the grant signal when enable 316 is active.

Selector Logic

Figure 4:
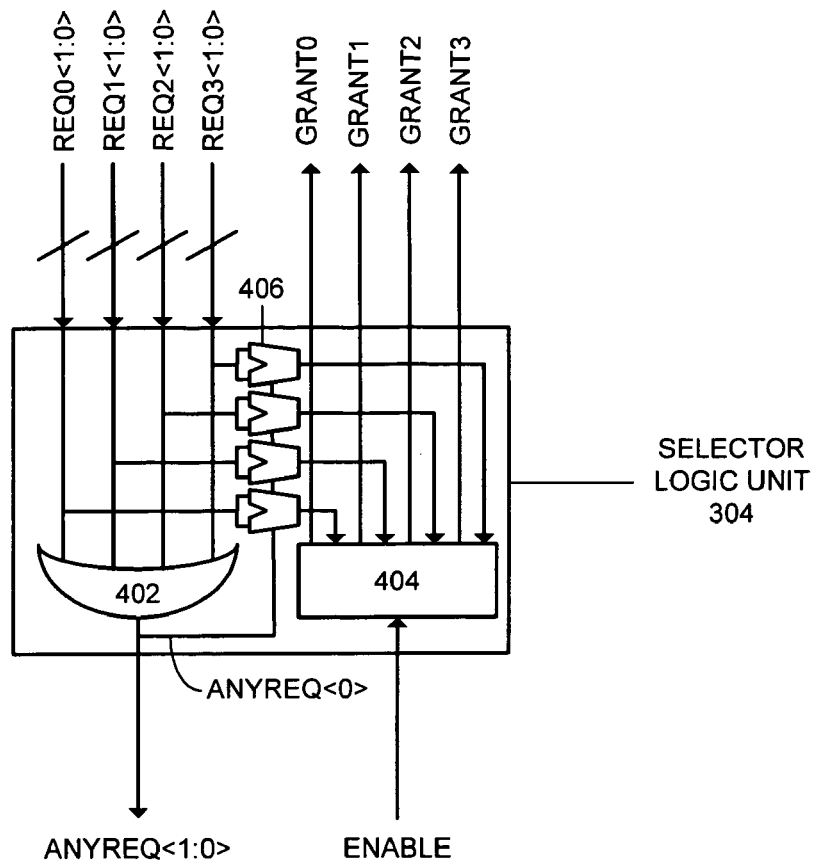
FIG. 4 illustrates a four-input selector logic unit in accordance with an embodiment of the present invention.

FIG. 4 illustrates the design of a four-input selector logic unit in accordance with an embodiment of the present invention. Selector logic units 304, 306, 308, 310, 312, and 314 operate in the same way, so only selector logic unit 304 will be described herein.

Selector logic unit 304 includes OR-gate 402, selector 404, and multiplexers 406 (4 of them). Selector logic unit 304 receives priorities and request signals for instructions within issue window 108 and provides grant signals to that enable the instructions to feed into execution units 110, 112, 114, and 116 based upon the priorities. Note that while selector logic unit 304 includes four inputs and four outputs, a practitioner with ordinary skill in the art will recognize that selector logic unit 304 can be generalized to include more or fewer inputs and outputs.

Table 1 defines the priority inputs to the selector logic unit from the issue window in accordance with an embodiment of the present invention. As shown in Table 1, each input "REQX" includes a <0> input and a <1> input. OR-gate 402 separately ORs the <0> inputs and the <1> inputs and generates an ANYREQ<1:0> signal to the next stage. REQX<0> is the high priority request line and REQX<1> is the low priority request line. If neither REQX<0> nor REQX<1> is set, the associated instruction is not ready for issue. REQX<1> being set indicates the associated instruction, which is low priority, is ready for issue, while REQX<0> being set indicates that the associated instruction, which is high priority, is ready for issue.

TABLE 1

| REQX<0> | REQX<1> | Request |
| --- | --- | --- |
| 0 | 0 | No request |
| 0 | 1 | Low priority request |
| 1 | 0 | High priority request |
| 1 | 1 | High priority request |

If any of the <1> inputs is set, the ANYREQ<1> signal is set. Similarly, if any of the <0> inputs is set, the ANYREQ<0> signal is set. ANYREQ<0> is also applied to multiplexers 406 to select the REQX<0> signals for application to selector 404. In the absence of a REQX<0> being set, multiplexers 406 select the REQX<1> signals for application to selector 404.

Selector 404 passes the enable signal to one of the four grant lines, GRANT0-GRANT3. The select signals select one of the grant lines based on the priority input lines REQ0-REQ3 and the state of ANYREQ<0>. If more that one input is selected, selector 404 passes the enable signal to the grant line associated with the request that is most nearly ready to be retired.

Shared Cache

Figure 5:
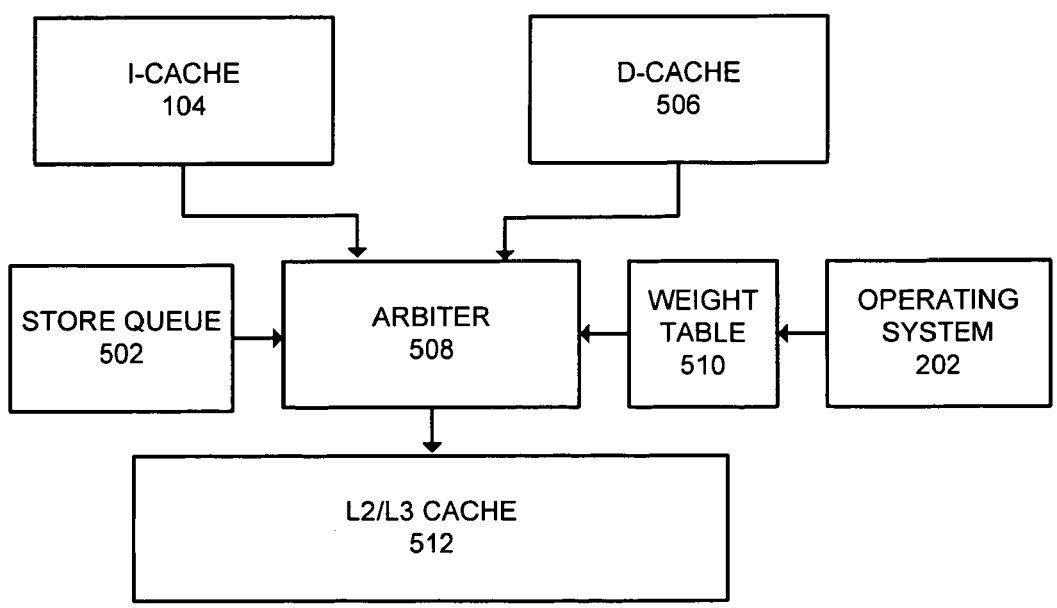
FIG. 5 illustrates a shared cache in accordance with an embodiment of the present invention.

FIG. 5 illustrates the design of a shared cache in accordance with an embodiment of the present invention. During operation at least one I-cache 104, and at least one data cache (D-cache) 506 can be in contention for access to L2/L3 cache 512. Operating system 202 provides thread priorities for executing threads to weight table 510. Arbiter 508 uses the values stored in weight table 510 to select whether store queue 502, I-cache 104, or D-cache 506 will obtain access to L2/L3 cache 512. This selection is based upon the executing thread associated with the requests from store queue 502, I-cache 104, and D-cache 506 and the weight for the executing threads from weight table 510. Note that store queue 502 is a store buffer used to store result data destined for L2/L3 cache.

Allocating Resources

Figure 6:
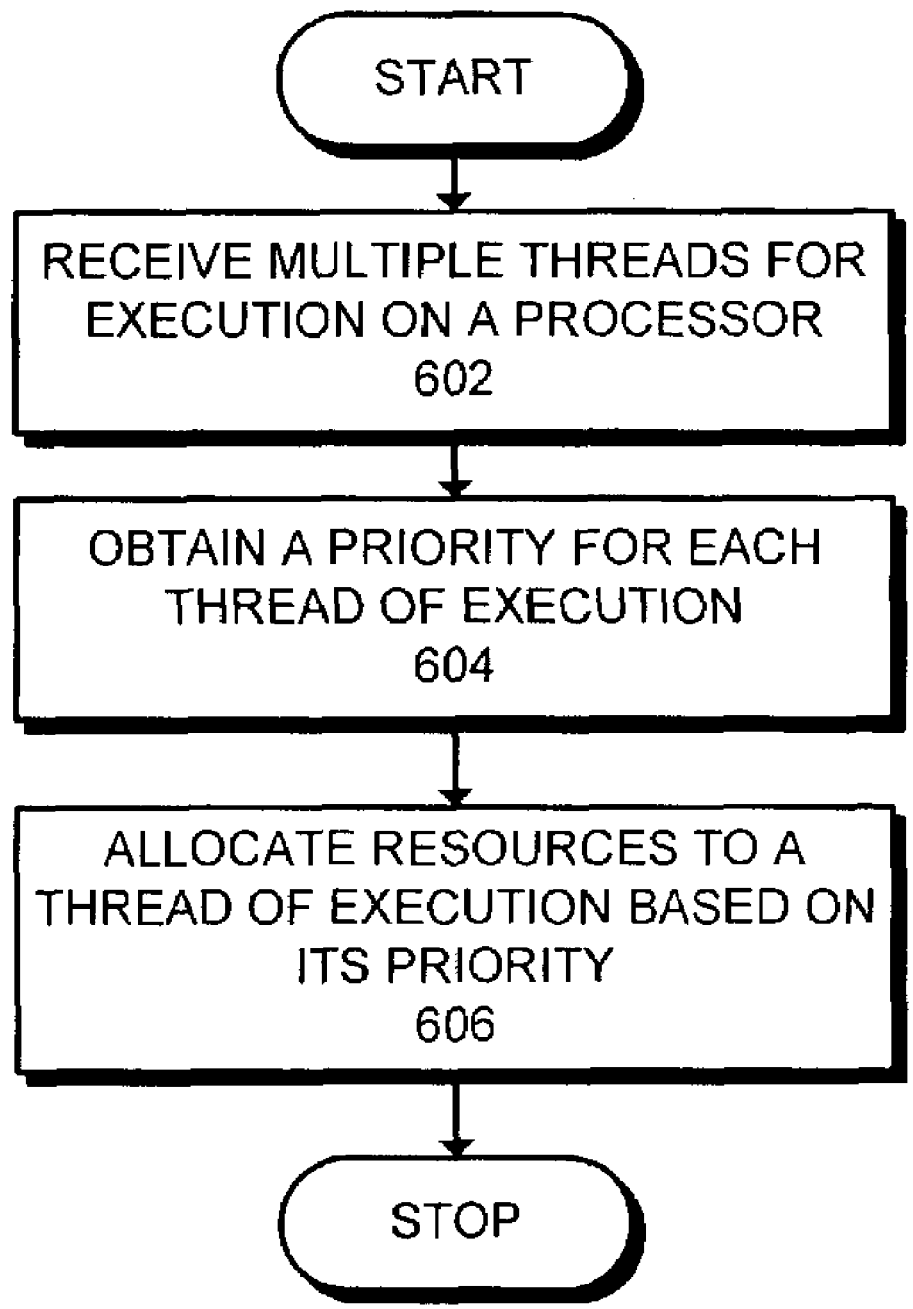
FIG. 6 presents a flowchart illustrating the process of allocating resources to threads based on the thread priority in accordance with an embodiment of the present invention.

FIG. 6 presents a flowchart illustrating the process of allocating resources based on the thread priority in accordance with an embodiment of the present invention. The system starts when a processor receives multiple threads to execute on an asymmetric multithreading (AMT) processor (step 602). Next, the system obtains a priority for each thread of execution (step 604). The system then allocates resources to each thread based upon its priority (step 606).

Other Variations

Note that the present invention is not limited to the specific computational resources described above, and can generally be applied to giving a high priority thread preferential access to any type of computational resource. Also note that there are many ways to fetch instructions for standard SMT processors. AMT can be implemented upon these SMT variations by enforcing a biasing principal.

Consider, for example, a processor that can simultaneously execute four threads and an eight-instruction wide I-cache fetch. A standard SMT could have an RR.1.8 fetch scheme or an RR.2.4 fetch scheme, where each cycle can fetch instructions for one thread (8-instructions) or two threads (4-instructions per thread), respectively.

RR. 1.8 is a natural fit for AMT. Instead of a round-robin priority scheme (or any other throughput-oriented heuristic priority scheme) to switch among those running threads suffering I-cache misses, AMT favors the main thread whenever possible. The lower priority threads can steal the I-fetch slots when the main thread has enough main thread instructions for dispatch.

RR.2.4 can statically partition the I-cache fetch into 2 channels. In this case, AMT can bind the main thread to one channel and share the remaining channel among the remaining threads.

There are also alternate ways to implement arbitration among the ready instructions in the issue window. Rather than the method described above in conjunction with FIGS. 3 and 4, a global flag can be asserted when any main thread instruction becomes ready. This flag can then be used to prevent low priority instructions from issuing.

A further method of implementing arbitration among the ready instructions in the issue window involves statically partitioning the issue queue into two or more sub-queues, with the main thread occupying one sub-queue, and the remaining threads sharing the other sub-queue.

Multiple threads can be assigned the highest priority based on the needs of the program. A special case exists when all executing threads are marked with the highest priority. In this case, the processor operates as a conventional SMT processor.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates favoring performance of a single-threaded application in a computer system that supports simultaneous multi-threading (SMT), wherein multiple threads of execution simultaneously execute in an interleaved manner on functional units within a processor in the computer system, the method comprising:

maintaining a priority for each simultaneously executing thread;

assigning a highest priority to a main thread of execution associated with the single-threaded application; and using these priorities in allocating a shared computational resource between the simultaneously executing threads, so that the main thread with the highest priority is given preferential access to the shared computational resource;

wherein the shared computational resource includes an issue window within the processor, and a shared cache associated with the processor;

wherein issuing instructions from the issue window for execution involves statically partitioning the issue queue into at least two sub-queues with the main thread occupying one sub-queue, and the remaining threads sharing any other sub-queues; and wherein when contention exists between threads to obtain access to the shared cache, an arbiter selects between accesses to the shared cache so that accesses associated with the main thread having the highest priority are given preferential access to the shared cache; and wherein this asymmetric treatment of the threads enables the computer system to favor the performance of the single-threaded application while performing simultaneous multi-threading.

2. The method of claim 1, wherein instructions for threads with higher priority are given preferential treatment while selecting instructions to be executed from the issue window.

3. The method of claim 1, wherein the shared computational resource includes an instruction fetch unit; and wherein threads of execution with the higher priority are given preferential treatment during an instruction fetch process.

4. The method of claim 1, wherein multiple threads can be assigned a highest priority.

5. The method of claim 1, wherein preferential access to the shared computational resource can be disabled, so that the processor behaves like a conventional SMT processor.

6. The method of claim 1, wherein the shared computational resource includes a store queue within the processor; and wherein threads with higher priority are given preferential treatment in obtaining store queue slots.

7. A computer system that facilitates favoring performance of a single-threaded application in the computer system which supports simultaneous multi-threading (SMT), wherein multiple threads of execution simultaneously execute in an interleaved manner on functional units within a processor in the computer system, comprising:

a priority maintaining mechanism configured to:

maintain a priority for each simultaneously executing thread; and assign a highest priority to a main thread of execution associated with the single-threaded application; and a priority using mechanism configured to use these priorities in allocating a shared computational resource between the simultaneously executing threads, so that the main thread with the highest priority is given preferential access to the shared computational resource;

wherein the shared computational resource includes an issue window within the processor, and a shared cache associated with the processor;

wherein issuing instructions from the issue window for execution involves statically partitioning the issue queue into at least two sub-queues with the main thread occupying one sub-queue, and the remaining threads sharing any other sub-queues; and wherein when contention exists between threads to obtain access to the shared cache, an arbiter selects between accesses to the shared cache so that accesses associated with the main thread having the highest priority are given preferential access to the shared cache; and wherein this asymmetric treatment of the threads enables the computer system to favor the performance of the single-threaded application while performing simultaneous multi-threading.

8. The computer system of claim 7,
wherein instructions for threads with higher priority are given preferential treatment while selecting instructions to be executed from the issue window.

9. The computer system of claim 7, wherein the shared computational resource includes an instruction fetch unit; and
wherein threads of execution with the higher priority are given preferential treatment during an instruction fetch process.

10. The computer system of claim 7, wherein multiple threads can be assigned a highest priority.

11. The computer system of claim 7, wherein preferential access to the shared computational resource can be disabled, so that the processor behaves like a conventional SMT processor.

12. The computer system of claim 7,
wherein the shared computational resource includes a store queue within the processor; and
wherein threads with higher priority are given preferential treatment in obtaining store queue slots.

* * * * *